US012750309B2

(12) United States Patent
Swaminathan

(10) Patent No.: US 12,750,309 B2
(45) Date of Patent: Sep. 29, 2026

(54) EFFICIENT SPLIT MANAGEMENT IN AN MC-LAG

(71) Applicant: HEWLETT PACKARD ENTERPRISE DEVELOPMENT LP, Spring, TX (US)

(72) Inventor: Venkatachalam Swaminathan, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 72 days.

(21) Appl. No.: 18/966,834

(22) Filed: Dec. 3, 2024

(65) Prior Publication Data

US 2026/0095404 A1 Apr. 2, 2026

(30) Foreign Application Priority Data

Oct. 1, 2024 (IN) ............................. 202441074454

(51) Int. Cl.
H04L 45/24 (2022.01)

(52) U.S. Cl.
CPC .................................. H04L 45/245 (2013.01)

(58) Field of Classification Search
None
See application file for complete search history.

(56) References Cited

U.S. PATENT DOCUMENTS 8,724,456 B1 * 5/2014 Hong .................. G06F 11/3055 370/225
10,050,855 B1 * 8/2018 Singh .................... H04L 67/145
10,164,873 B1 * 12/2018 Sood ..................... H04L 45/245
10,298,458 B2 * 5/2019 Ayandeh ............... H04L 12/413
12,273,263 B1 * 4/2025 Verma ................... H04L 45/245
12,388,747 B2 * 8/2025 Raj ........................ H04L 12/185
2010/0020680 A1 * 1/2010 Salam ................. H04L 41/0677 370/220

(Continued)

OTHER PUBLICATIONS

Hewlett Packard Enterprise Development LP, "AOS-CX 10.14 Virtual Switching Extension (VSX) Guide," Nov. 2023, Version 1, 244 pages.

(Continued)

Primary Examiner — Backhean Tiv
(74) Attorney, Agent, or Firm — Hewlett Packard Enterprise Patent Department

(57) ABSTRACT

A network device is provided. During operation, the network device receives control information associated with a control protocol running on a multi-chassis link aggregation group (MC-LAG) from a first link coupling a second network device of the MC-LAG. The network device determines whether the second network device is operational via a second link, which is separate from the first link. The network device determines a split in the MC-LAG in response to determining the unavailability of the first link and the availability of the second network device via the second link. The network device checks a set of selection conditions in a predetermined order based on respective sets of operational information associated with the network device and the second network device. The network device then selects the second network device for forwarding traffic of the MC-LAG in response to the set of selection conditions indicating the second network device.

20 Claims, 7 Drawing Sheets

(56) References Cited

U.S. PATENT DOCUMENTS

| | | | | |
|---|---|---|---|---|
| 2012/0033669 | A1* | 2/2012 | Mohandas | H04L 45/586<br>370/392 |
| 2012/0033672 | A1* | 2/2012 | Page | H04L 49/552<br>370/395.53 |
| 2012/0266013 | A1* | 10/2012 | Shannon | H04L 41/08<br>714/E11.073 |
| 2014/0362736 | A1* | 12/2014 | Ramanathan | H04L 41/00<br>370/254 |
| 2014/0369186 | A1* | 12/2014 | Ernstrom | H04L 49/55<br>370/228 |
| 2015/0271104 | A1* | 9/2015 | Chikkamath | H04L 12/4633<br>370/401 |
| 2016/0301597 | A1* | 10/2016 | Jayakumar | H04L 45/245 |
| 2017/0163473 | A1* | 6/2017 | Sadana | H04L 41/0645 |
| 2017/0163524 | A1* | 6/2017 | Rajendran | H04L 45/122 |
| 2018/0083863 | A1* | 3/2018 | Zhu | H04L 45/245 |
| 2019/0058653 | A1* | 2/2019 | Mirsky | H04L 45/245 |
| 2019/0207803 | A1* | 7/2019 | Kalburgi | H04L 41/0654 |
| 2020/0244569 | A1* | 7/2020 | Gao | H04L 45/22 |
| 2023/0246949 | A1* | 8/2023 | Liu | H04L 45/245<br>709/238 |
| 2024/0039834 | A1* | 2/2024 | Megathlin | H04L 45/245 |
| 2025/0071049 | A1* | 2/2025 | Wang | H04L 45/245 |
| 2025/0392510 | A1* | 12/2025 | Koundinya | H04L 41/0816 |
| 2026/0095404 | A1* | 4/2026 | Swaminathan | H04L 45/245 |

OTHER PUBLICATIONS

IEEE, "IEEE Std 802.1AX 2020," available online at <https://standards.ieee.org/ieee/802.1AX/6768/>, Jan. 30, 2020,, 33 pages.

* cited by examiner

EFFICIENT SPLIT MANAGEMENT IN AN MC-LAG

BACKGROUND

A network device, such as a switch, may be deployed in different network topologies. For example, the network device can be deployed in a multi-chassis link aggregation group (MC-LAG), which can operate as an aggregated link spanning multiple network devices.

BRIEF DESCRIPTION OF THE FIGURES

In the figures, like reference numerals refer to the same figure elements.

DETAILED DESCRIPTION

Figure 1:
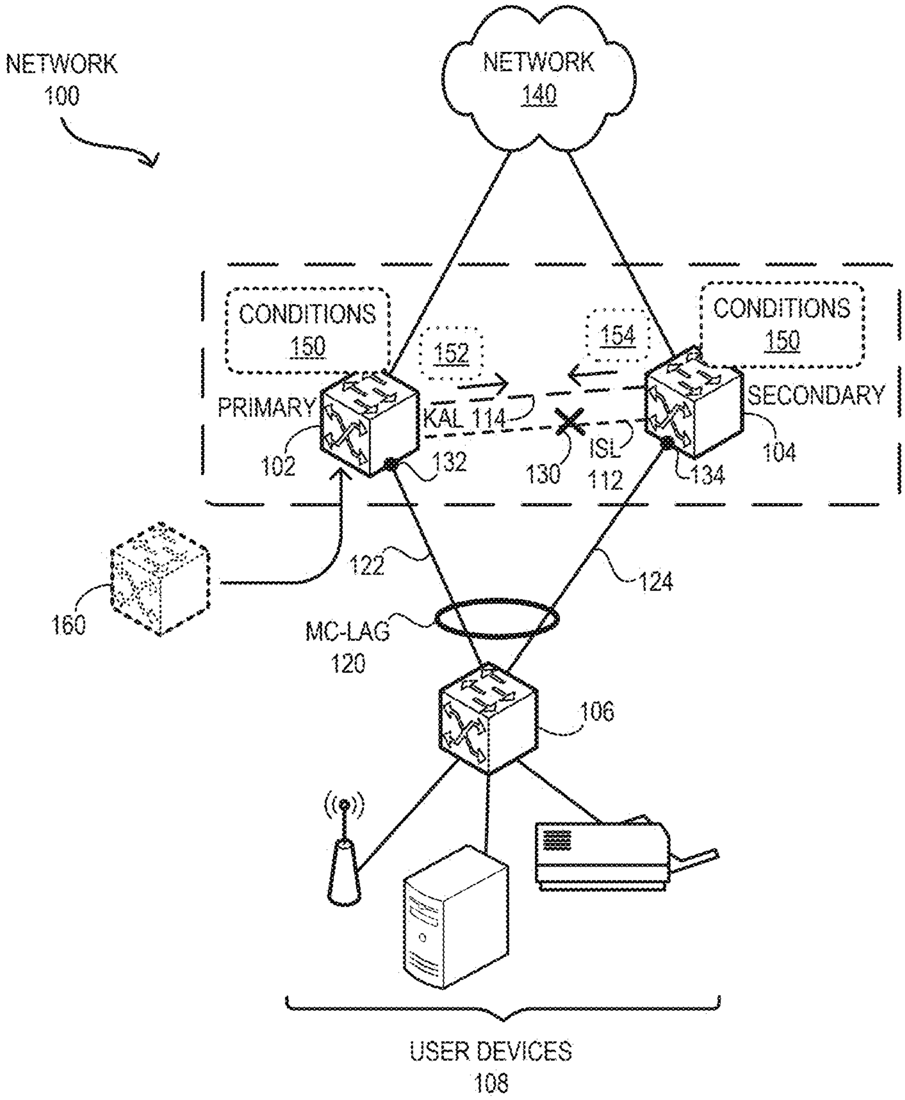
FIG. 1 illustrates an example of efficient split management in an MC-LAG, in accordance with an aspect of the present application.

In a network, two or more network devices (also referred to as "member devices") can be coupled to another network device, such as an access device, via an MC-LAG. The access device can be coupled to user devices (e.g., a personal device, such as a computer or a server) and provide access to these user devices. The access device can be coupled to the member devices via respective links. These links can be grouped together to operate as a logical or virtual link, which is represented by the MC-LAG. The member devices can aggregate traffic from the access device via the MC-LAG. The member devices may then forward the aggregated traffic to an external network, such as a wide-area network (WAN) (e.g., the Internet).

The member devices of an MC-LAG can be coupled to each other via a synchronization link that can be used for synchronizing between the member devices. The synchronization link can be between the member devices (i.e., not with a client device). Therefore, the synchronization link can be referred to as an inter-device link (IDL) or an inter-switch link (ISL). A respective member device can synchronize state information, such as protocol states of the network communication protocols running on the member device, with the other member device via the IDL. The member devices can run an MC-LAG control protocol (e.g., Virtual Switching Extension (VSX), Virtual Trunk Protocol (VTP), etc.) that can exchange control information between the member devices. The control information can include the state information associated with the network protocols. Therefore, by exchanging the control information, the member devices can synchronize the state information. Based on the synchronized information, any of the member devices can forward traffic from the access device to the external network since the same state information can be available at each of the member devices.

If the IDL becomes unavailable in the MC-LAG, the member devices may no longer be connected to each other. Such a condition can be referred to as a "split" in the MC-LAG. The split may occur in the MC-LAG for a number of reasons, such as an administrator turning off the IDL, one of the member devices being rebooted (e.g., due to an upgrade), and the occurrence of a failure associated with the IDL (e.g., a link or port failure).

The aspects described herein address the problem of efficiently managing a split in the MC-LAG by (i) synchronizing operational information, such as link status, operational time, device state history, learned MAC addresses, and traffic statistics, among the member devices; and (ii) checking an order of conditions based on the operational information to determine which member device is to be selected for forwarding during the split and synchronization upon recovery from the split. If a particular condition does not indicate which member device is to be selected, the member device can check a subsequent condition in the order. Here, the operational information can be distinct from the state information, which includes the protocol states of the member devices. The protocol states can include information associated with the protocol that can be used to forward a packet. For example, for Ethernet, the protocol states can include a respective media access control (MAC) address learned at a member device. Similarly, for a multicast protocol, such as Protocol Independent Multicast (PIM), the protocol states can include forwarding information of a respective multicast group.

Typically, the IDL can be a layer-2 link that may communicate based on a layer-2 protocol, such as Ethernet. An MC-LAG may also include a keep-alive link (KAL) between the member devices. The KAL may be a layer-3 link (e.g., based on Internet Protocol (IP)) via which a member device can detect the availability of the other member device. For example, a member device may send a periodic keepalive message to the other member device to indicate its availability. Currently, one of the member devices can be configured as a primary device, and the rest of the member devices can be configured as secondary devices. The primary device can be responsible for forwarding traffic during a split.

Accordingly, if the IDL becomes unavailable (e.g., due to a link failure) but the KAL remains operational, the secondary device can determine a split has occurred in the MC-LAG and determine that the secondary device can no longer synchronize information with the primary device. For example, if the IDL is unavailable, the secondary device can no longer share a MAC address learned via the interface participating in the MC-LAG. This interface can be referred to as an MC-LAG interface. The secondary device may also determine that the primary device is operational via the KAL. The default option of the control protocol running on the member devices can indicate that the secondary device should suspend traffic forwarding via the MC-LAG interface with the expectation that the primary device can continue to forward traffic from the external network to the access device. As a result, the secondary device can suspend the MC-LAG interface. Suspending traffic forwarding via the MC-LAG can be referred to as the suspension operation. However, if the primary device experiences additional failure, such as a line card failure or a port failure associated with the MC-LAG interface, the primary device may not be able to forward traffic to the access device via the MC-LAG. Under such circumstances, since both primary and secondary devices stop forwarding traffic, the access device may not receive traffic through the MC-LAG.

Furthermore, upon recovery from the split, the secondary device can synchronize state information from the primary device. In other words, the primary device can be selected as the source of the synchronization, and the synchronization operation is executed on the secondary device. To perform the synchronization operation, the secondary device can update its local state information based on the corresponding state information received from the primary device. However, if the state information of the secondary device is updated based on information received via the MC-LAG during the synchronization operation, there can be a race condition at the secondary device. Therefore, the secondary device may need to suspend its MC-LAG interface to avoid the state information being updated during the synchronization operation. However, if the primary device becomes unavailable (e.g., due to a failure), a new primary device can be deployed in the MC-LAG. Under such circumstances, the new primary device may not have the updated state information. In addition, while the old primary device remains unavailable, the secondary device may continue to forward traffic via its MC-LAG interface. As a result, the secondary device may not need synchronization from the new primary device. By performing the unnecessary synchronization, the secondary device can incur traffic loss.

To address this issue, a respective member device can be configured with a set of conditions to be checked in a predetermined order (or sequence). Each condition in the set can indicate whether the synchronization operation and the suspension operation are to be executed at the primary device or the secondary device. If the condition indicates a "tie" between the member devices, the subsequent condition in the predetermined order is checked. If a member device is selected for the synchronization operation, the selected member device can obtain state information from the other member device, which can be the source for the synchronization operation. Similarly, if a member device is selected for the suspension operation, the selected member device can suspend traffic forwarding via its MC-LAG interface.

The predetermined order of conditions can determine the respective link status (e.g., up or down) of a respective member device in the MC-LAG. For example, if the MC-LAG links of the primary device are down or unavailable and the MC-LAG links of the secondary device are up or available, the suspension operation is executed on the primary device. If the MC-LAG links are up on primary and secondary devices, a subsequent condition is checked. The subsequent conditions can include, but are not limited to, the history of device states not indicating a steady state for the secondary device, the operational time (or uptime) of the secondary device being lower than the operational time of the primary device, and the secondary device having favorable traffic statistics (e.g., has learned more MAC addresses and provided more address resolutions).

When a split is detected in the MC-LAG, the member devices can synchronize operational information, such as link status, operational time, device state history, learned MAC addresses, and traffic statistics, with each other over the KAL. It should be noted that if the KAL becomes unavailable while the IDL remains operational, the member devices may synchronize operational information with each other over the IDL. Here, the operational information is distinct from the state information, which can include the protocol states of the member devices. Upon synchronizing the operational information, each member device can compare the set of conditions against the operational information in the predetermined order. By sequentially comparing the conditions against corresponding operational information, the member devices can determine which member device is to suspend its MC-LAG interface. The other member device can then continue to forward traffic via its MA-LAG interface.

Moreover, when the MC-LAG recovers from the split, the member devices can compare the set of conditions against the operational information in the predetermined order to determine whether to synchronize the state information from the primary device to the secondary device or vice versa. The selected member device can retrieve state information from the source member device. Upon completion of the synchronization, the MC-LAG can resume its regular operations. In this way, the MC-LAG can support efficient split management. In particular, when the MC-LAG splits, the selected member device can suspend traffic forwarding via its MC-LAG interface while the other member device can continue to forward traffic. Furthermore, upon recovery from the split, the selected member device can synchronize the state information from the source member device.

In this disclosure, the term "switch" is used in a generic sense, and it can refer to any standalone network device or fabric switch operating in any network layer. "Switch" should not be interpreted as limiting examples of the present invention to layer-2 networks. Any device that can forward traffic to an external device or another switch can be referred to as a "switch." Furthermore, if the switch facilitates communication between networks, the switch can be referred to as a gateway switch. Any physical or virtual device (e.g., a virtual machine or switch operating on a computing device) that can operate as a network device and forward traffic to an end device can be referred to as a "switch." If the switch is a virtual device, the switch can be referred to as a virtual switch. Examples of a "switch" include, but are not limited to, a layer-2 switch, a layer-3 router, a routing switch, a component of a Gen-Z network, or a fabric switch comprising a plurality of similar or heterogeneous smaller physical and/or virtual switches.

The term "packet" refers to a group of bits that can be transported together across a network. "Packet" should not be interpreted as limiting examples of the present invention to a particular layer of a network protocol stack. "Packet" can be replaced by other terminologies referring to a group of bits, such as "message," "frame," "cell," "datagram," or "transaction." Furthermore, the term "port" can refer to a connection endpoint of a link that can receive or transmit data. "Port" can also refer to the hardware, software, and/or firmware logic that can facilitate the operations of that port.

FIG. 1 illustrates an example of efficient split management in an MC-LAG, in accordance with an aspect of the present application. A network 100 can include a number of network devices (e.g., switches), and may include network components, such as layer-2 and layer-3 hops, and tunnels. In some examples, network 100 can be an Ethernet network, InfiniBand network, or other network, and may use a corresponding network communication protocol, such as IP, FibreChannel over Ethernet (FCoE), or other protocols.

Network 100 can include network devices 102, 104, and 106. In this example, network device 106 can be an access device coupling user devices 108. A respective network device in network 100 can be associated with a MAC address and an IP address and can include at least one processing resource. Examples of a processing resource can include, but are not limited to, a processor core, a graphics processing unit (GPU), and a tensor processing unit (TPU).

Network device 106 can be coupled to network devices 102 and 104 over links 122 and 124, respectively. Here, links 122 and 124 can be grouped together to form an MC-LAG 120. Member devices 102 and 104 can be coupled to links 122 and 124 through interfaces 132 and 134, respectively. Therefore, interfaces 132 and 134 can be referred to as MC-LAG interfaces. MC-LAG 120 can be represented as a virtual or logical link that can couple network device 106 to network devices 102 and 104. Since network devices 102 and 104 are the member network devices of MC-LAG 120, network devices 102 and 104 can also be referred to as member devices 102 and 104, respectively. Member devices 102 and 104 can aggregate traffic from user devices 108 via MC-LAG 120. Member devices 102 and 104 may then forward the aggregated traffic to an external network 140 (e.g., a WAN, such as the Internet).

Member devices 102 and 104 can be coupled to each other via a link 112 (e.g., an IDL). Member devices 102 and 104 can synchronize state information, such as protocol states of the network protocols, with each other via link 112. For example, if a new MAC address is learned at member device 102, member device 102 can share the learned MAC address with member device 104 via link 112. Member devices 102 and 104 can run an MC-LAG control protocol (e.g., VSX, VTP, etc.) that can exchange control information to synchronize the state information with each other over link 112. Based on the synchronized information, any of member devices 102 and 104 can forward traffic from network device 106 to network 140 since the same state information can be available at both member devices 102 and 104.

Link 112 can be a layer-2 link that may communicate based on a layer-2 protocol, such as Ethernet. In addition, member devices 102 and 104 can be coupled to each other via link 114 (e.g., a KAL). Member devices 102 and 104 may detect each other's availability by sending periodic keepalive messages over link 114. During operation, link 112 may become unavailable (or down) due to an event 130. Examples of event 130 can include, but are not limited to, a failure of link 112, a failure of a line card in member device 102 or 104, a reboot of member device 102 or 104 (e.g., due to an upgrade or power cycle), a failure of member device 102 or 104, and an administrator turning down link 112. If link 112 becomes unavailable, MC-LAG 120 can become split. In this example, member devices 102 and 104 can be configured as the primary and secondary devices, respectively. Member device 102 can be responsible for forwarding traffic during the split.

When link 112 becomes unavailable, member device 104 can determine a split has occurred in MC-LAG 120 and determine that member device 104 can no longer synchronize information (e.g., a learned MAC address) with member device 102. Member device 104 may also determine that member device 102 is operational via link 114. The default option of the control protocol running on member devices 102 and 104 can indicate that member device 104 should suspend traffic forwarding via interface 134 with the expectation that member device 102 can continue to forward traffic from network 140 to network device 106. As a result, member device 104 can execute the suspension operation by suspending traffic forwarding via interface 134. However, if member device 102 experiences a failure associated with interface 132 (e.g., a line card failure), member device 102 may not be able to forward traffic through MC-LAG 120. Under such circumstances, since both member devices 102 and 104 have stopped forwarding traffic, network device 106 may not receive traffic through MC-LAG 120.

Furthermore, upon recovery from the split (e.g., recovery from event 130), member device 104 can synchronize state information from member device 102. In other words, member device 102 can be selected as the source of the synchronization, and the synchronization operation can be executed on member device 104. To perform the synchronization, member device 104 may need to suspend interface 134 to avoid the state information being updated during the synchronization operation. However, if member device 102 becomes unavailable (e.g., due to a failure), a new member device 160 (denoted with dotted lines) can be deployed in MC-LAG 120. Under such circumstances, member device 160 may not have the updated state information. In addition, while member device 102 remains unavailable, member device 104 may continue to forward traffic via interface 134. As a result, member device 104 may not need synchronization from member device 160. By performing the unnecessary synchronization, member device 104 can incur traffic loss due to the suspension of interface 134.

To address this issue, member devices 102 and 104 can be configured with a set of conditions 150 to be checked in a predetermined order. Each condition in conditions 150 can indicate whether the synchronization operation and the suspension operation are to be executed at member device 102 or member device 104. If any condition in conditions 150 indicates a tie between member devices 102 and 104, the subsequent condition in conditions 150 can be checked. If member device 104 is selected for the synchronization operation, member device 104 can obtain state information from member device 102, which can be the source for the synchronization operation. Similarly, if member device 102 is selected for the suspension operation, member device 102 can suspend traffic forwarding via interface 132.

When a split is detected in MC-LAG 120, member devices 102 and 104 can synchronize the operational information over link 114. For example, operational information 154 of member device 104 can include the link status of link 124, the operational time (or uptime) of link 124 (i.e., the duration for which link 124 has been operational), the history of device states associated with member device 104, traffic statistics associated with MC-LAG 120 (e.g., the volume of traffic transferred via interface 134), a number of address resolutions (e.g., Address Resolution Protocol (ARP) responses), and a number of MAC learned at member device 104. Operational information 152 of member device 102 can also include corresponding information. Here, operational information 152 and 154 can be distinct from the state information, which can include the protocol states of member devices 102 and 104. It should be noted that if KAL 124 becomes unavailable while IDL 122 remains operational, member devices 102 and 104 may synchronize operational information with each other over IDL 122.

Upon synchronizing operational information 152 and 154 over KAL 124 (or IDL 122), both member devices 102 and 104 can have operational information 152 and 154. Member devices 102 and 104 can then compare the set of conditions against operational information 152 and 154 in the predetermined order. By sequentially comparing the conditions against corresponding operational information, member devices 102 and 104 can determine which member device is to suspend its MC-LAG interface. The other member device can continue to forward traffic via its MA-LAG interface. For example, if the link status of link 122 indicates unavailability, the suspension operation can be executed on member device 102, and hence, interface 132 can be suspended from forwarding traffic. Accordingly, member device 104 can continue to forward traffic via interface 134 and limit traffic loss during the split.

Moreover, when MC-LAG 120 recovers from the split, member devices 102 and 104 can compare conditions 150 against operational information 152 and 154 in the predetermined order to determine whether to synchronize the state information from member device 102 to member device 104 or vice versa. If member device 102 is selected, member device 102 can execute the synchronization operation. To do so, member device 102 can suspend traffic forwarding via interface 132 and retrieve state information from member device 104, which can be the source.

Upon completion of the synchronization, member device 102 can configure itself based on the state information synchronized from member device 104, which can include setting the protocol states at member device 102 based on the synchronized information. Subsequently, member device 102 can resume traffic forwarding via interface 132 based on the protocol states. When both interfaces 132 and 134 start forwarding traffic, MC-LAG 120 can recommence its regular operations. In this way, MC-LAG 120 can support efficient split management by selecting the member device for executing the suspension and synchronization operations.

Figure 2:
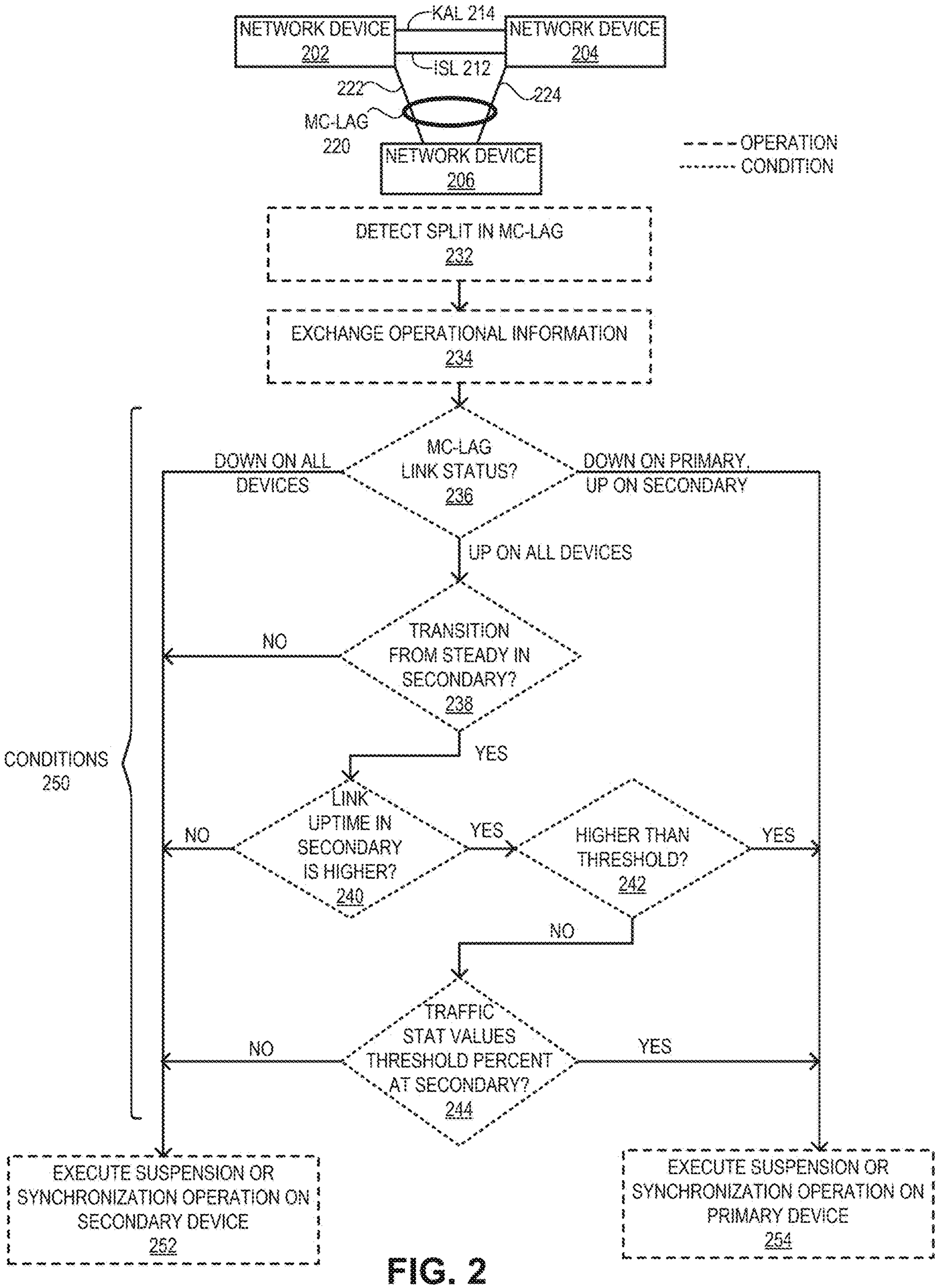
FIG. 2 illustrates an example of an order of selection conditions for selecting a network device for suspension and synchronization, in accordance with an aspect of the present application.

FIG. 2 illustrates an example of an order of selection conditions for selecting a network device for suspension and synchronization, in accordance with an aspect of the present application. In this example, network device 206 can be coupled to network devices 202 and 204 via links 222 and 224, respectively. Links 222 and 224 can be grouped as MC-LAG 220. MC-LAG 220 can be represented as a virtual or logical link that can couple network device 206 to network devices 202 and 204. Since network devices 202 and 204 are the member network devices of MC-LAG 220, network devices 202 and 204 can also be referred to as member devices 202 and 204, respectively. Member devices 202 and 204 can aggregate traffic from network device 206 via MC-LAG 220. Member devices 202 and 204 may then forward the aggregated traffic to an external network. Member devices 202 and 204 can be configured as the primary and secondary devices, respectively.

Member devices 202 and 204 can be coupled to each other via link 212 (e.g., an IDL). Member devices 202 and 204 can run an MC-LAG control protocol (e.g., VSX, VTP, etc.). Based on the control protocol, member devices 202 and 204 can synchronize state information, such as protocol states of the network protocols, with each other via link 212. For example, if a new MAC address is learned at member device 202, member device 202 can share the learned MAC address with member device 204 via link 212. Based on the synchronized information, any of member devices 202 and 204 can forward traffic from network device 206 to the external network since the same state information can be available at both member devices 202 and 204.

Link 212 can be a layer-2 link that may communicate based on a layer-2 protocol, such as Ethernet. In addition, member devices 202 and 204 can be coupled to each other via link 214 (e.g., a KAL). Member devices 202 and 204 may detect each other's availability by sending periodic keepalive messages over link 214. If link 212 becomes unavailable, member devices 202 and 204 can detect a split in MC-LAG 220 (operation 222). Since link 212 is coupled to member devices 202 and 204, they can detect whether link 212 is operational (e.g., by detecting the signal over link 212). Subsequently, member devices 202 and 204 can exchange operational information (operation 224).

Operational information from member device 202 can include one or more of: the link status of link 222 (e.g., whether link 222 is up), the operational time (or uptime) for link 222 (e.g., the duration for which link 222 has been operational), the history of device states associated with member device 202 (e.g., the current device state compared to the previous state), traffic statistics associated with link 222 (e.g., the volume of traffic transferred via link 222), a number of address resolutions and a number of MAC learned at member device 202. Similarly, operational information from member device 204 can include one or more of: the link status of link 224, the operational time (or uptime) for link 224, the history of device states associated with member device 204, traffic statistics associated with link 224, a number of address resolutions and a number of MAC learned at member device 204.

The device states associated with a respective member device can include steady, standalone, peering, and split. Member devices 202 and 204 can be in a steady state when link 212 and link 214 are operational (or up), and member switches 202 and 204 are synchronizing with each other. Member devices 202 and 204 can be in a standalone state when link 212 and link 214 are both unavailable (or down). Member device 202 can be in a peering state when member device 202 has booted up (e.g., due to replacement or a power cycle) and is waiting to connect with member device 204. Similarly, member device 204 can be in a peering state when member device 204 has booted up and is waiting to connect with member device 202. Member devices 202 and 204 can be in a split state when link 212 is unavailable and link 214 is operational.

To select which member device is to perform the suspension operation, member devices 202 and 204 can be configured with a set of conditions 250 to be checked in a predetermined order. Each condition in conditions 250 can indicate whether the synchronization operation and the suspension operation are to be executed at member device 202 or member device 104. If the condition indicates a tie between member devices 202 and 204, the subsequent condition in conditions 250 can be checked. The predetermined order for conditions 250 can include, in order, conditions 236, 238, 240, 242, and 244. Here, conditions 236, 238, 240, 242, and 244 are sequenced in a predetermined order by an administrator. It should be noted that conditions 250 may include fewer or more conditions than the ones described in FIG. 2. Furthermore, conditions 250 may be sequenced in a different order by the administrator (e.g., based on the current condition of MC-LAG 220). Upon exchanging the operational information, member devices 202 and 204 can check the MC-LAG link status (condition 236) (i.e., whether links 222 and 224 are operational).

If the links of the primary device (i.e., link 222 of member device 202) are down and at least one link of the secondary device (i.e., link 224 of member device 204), the secondary device can be suitable for forwarding traffic via the active link. Accordingly, the suspension operation can be executed on the primary device (i.e., member device 202) (operation 254). On the other hand, if links are down on both devices, the suspension operation can be executed on the secondary device (i.e., member device 204) (operation 252) because it is the default option of the control protocol running on member devices 202 and 204. If links are operational on both devices (i.e., both links 222 and 224 are operational), condition 236 can be a tie. Therefore, member devices 202 and 204 can check the operational information against subsequent condition 238 (i.e., the condition after condition 236 in conditions 250).

If links 222 and 224 are operational while link 212 is down, member devices 202 and 204 have been operating in the standalone state. Therefore, in accordance with condition 238, member devices 202 and 204 can check the device history and determine the history of transition between device states. If the previous state for member device 204 is the peering state, member device 204 has been rebooted and, hence, it has been waiting for reestablishing link 212 to synchronize with member device 202. On the other hand, if the previous state for member device 202 includes the steady state, member device 202 has been operational before the split. Since a device that has been in a steady state is better suited to forward traffic, member device 202 (i.e., the primary device) can be selected for forwarding traffic. Therefore, the suspension operation can be executed on the secondary device (i.e., member device 204) (operation 252).

On the other hand, if member device 204 has transitioned from the steady state to the standalone state, member device 204 may not be the selection for the suspension operation. Member devices 202 and 204 can then check the operational information against subsequent condition 240, which can include checking the operational time (or uptime) for links 222 and 224. If the operational time of the link in the primary device (i.e., operational time of link 222) is higher than or equal to the operational time of the link in the secondary device (i.e., operational time of link 224), member device 202 (i.e., the primary device) can be selected for forwarding traffic. Therefore, the suspension operation can be executed on the secondary device (i.e., member device 204) (operation 252).

On the other hand, if the operational time of the link in the secondary device (i.e., operational time of link 224) is higher than the operational time of the link in the primary device (i.e., operational time of link 222), member devices 202 and 204 can then check the operational information against subsequent condition 242. Condition 242 can include determining whether the difference between the operational time of the link in the secondary device and the operational time of the link in the primary device is higher than a threshold time (e.g., five minutes). If the link in the secondary device has been operational for more than the threshold time (i.e., more than five minutes), the suspension operation can be executed on the primary device (i.e., member device 202) (operation 254).

If the difference is less than the threshold time, member devices 202 and 204 can then check the operational information against subsequent condition 244. Condition 244 can include comparing the traffic statistics of member devices 202 and 204. Traffic statistics of a respective member device can include values indicating traffic volume, the number of address resolutions, and the number of MAC addresses learned at the member device. These values can be referred to as traffic statistics values. The traffic statistics values can be compared based on percentage. For example, with respect to the total number of MAC addresses learned via the MC-LAG, the percentage of MAC addresses learned at the secondary device can be compared against the percentage of MAC addresses learned at the primary device.

If the respective percentages of the traffic statistics values are at a threshold percentage at the secondary device (i.e., member device 204), member device 204 (i.e., the secondary device) can be selected for forwarding traffic. For example, if the secondary device has learned sixty percent of the learned MAC addresses and has generated sixty percent of the ARP responses, the secondary device can forward traffic during the split. The percentage value can be determined by an administrator based on the current network condition. Therefore, the suspension operation can be executed on the primary device (i.e., member device 202) (operation 254). Otherwise, the suspension operation can be executed on the secondary device (i.e., member device 204) (operation 252).

Moreover, when MC-LAG 220 recovers from the split, member devices 202 and 204 can compare conditions 250, in order, against the operational information in the predetermined order to determine whether to synchronize the state information from member device 202 to member device 204 or vice versa. If the primary device (i.e., member device 202) is selected, the primary device can execute the synchronization operation (operation 254). On the other hand, if the secondary device (i.e., member device 204) is selected, the secondary device can execute the synchronization operation (operation 252). Performing the synchronization operation can include suspending traffic forwarding via the MC-LAG interface and retrieving the state information from the other member device. When the synchronization operation is complete, member device 202 can configure itself based on the state information synchronized from member device 204 and resume traffic forwarding via MC-LAG 220, thereby restoring the regular operation of MC-LAG 220.

Figure 3:
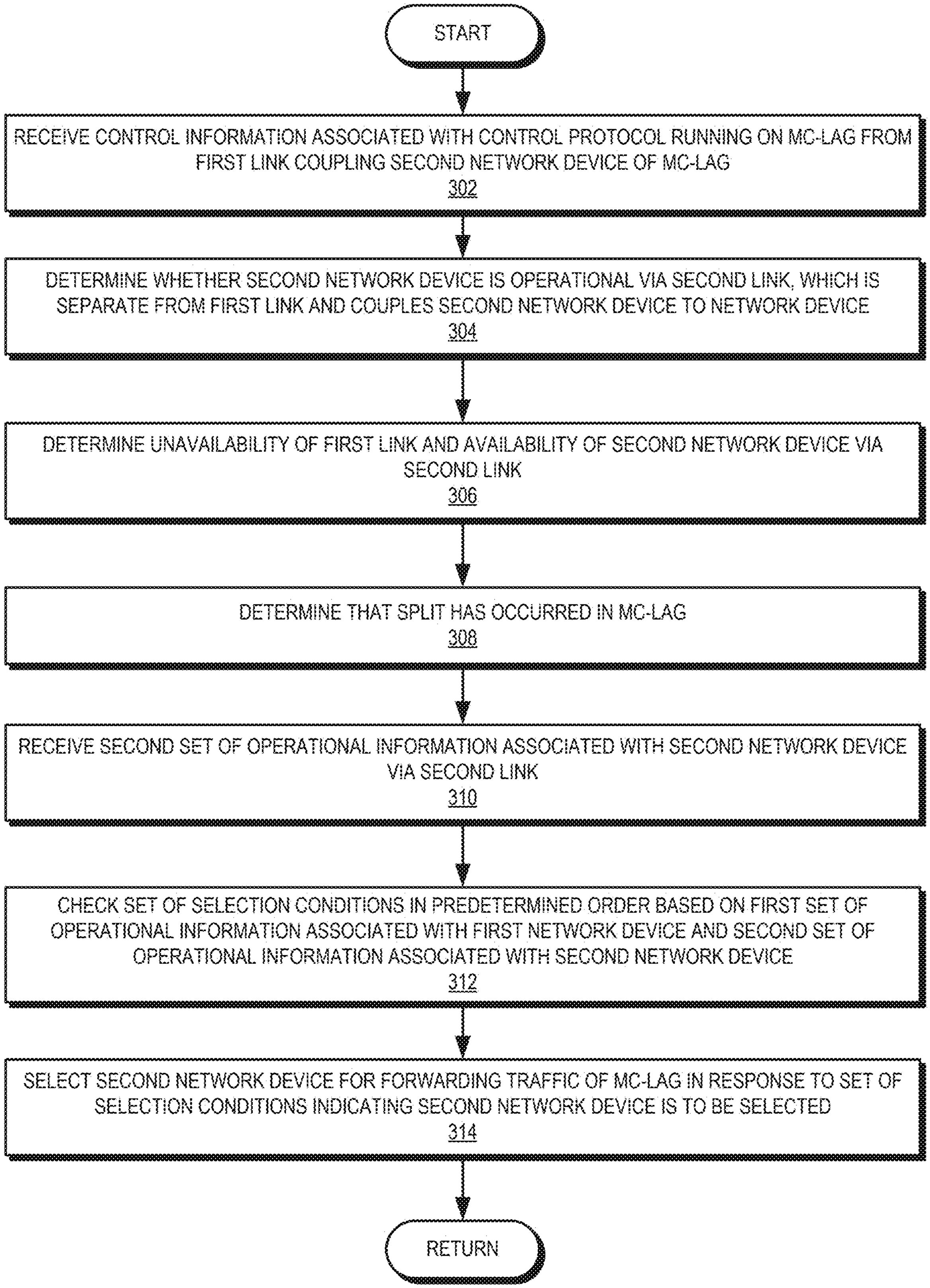
FIG. 3 presents a flowchart illustrating an example of a process of a network device in an MC-LAG efficiently managing a split in the MC-LAG, in accordance with an aspect of the present application.

FIG. 3 presents a flowchart illustrating an example of a process of a network device in an MC-LAG efficiently managing a split in the MC-LAG, in accordance with an aspect of the present application. During operation, the network device can receive control information associated with the control protocol running on the MC-LAG (i.e., on the member devices of the MC-LAG) (operation 302). The network device can receive the control information from a first link (e.g., link 112 in FIG. 1) coupling a second network device of the MC-LAG. Therefore, the network device and the second network devices can be the member devices of the MC-LAG (e.g., network devices 102 and 104 of MC-LAG 120 in FIG. 1). The control information can include state information associated with the network protocols running on the network device and the second network device.

The network device can then determine whether the second network device is operational via a second link (e.g., link 114 in FIG. 1) (operation 304). Here, the second link can be separate from the first link and can couple the second network device to the network device. The network device and the second network device can determine each other's operational state via the second link. Subsequently, the network device can determine the unavailability of the first link and the availability of the second network device via the second link (operation 306). Accordingly, the network device can determine that a split has occurred in the MC-LAG (operation 308). Since the first link is unavailable, the network device can no longer receive the control information associated with the MC-LAG from the second network device. Therefore, the network device can determine the split in the MC-LAG. In the example in FIG. 1, network device 102 can determine a split in MC-LAG 120 by detecting the unavailability of link 112 and detecting the availability of network device 104 via link 114.

The network device can then receive a second set of operational information (e.g., operational information 154 in FIG. 1) associated with the second network device via the second link (operation 310). Here, the second set of operational information can include the link status of a respective link of the second network device in the MC-LAG, the operational time of the link, the device state history associated with the second network device, the traffic volume associated with the MC-LAG at the second network device, a number of address resolutions by the second network device, and a number of layer-2 addresses learned at the second network device.

The network device can then check a set of selection conditions in a predetermined order (e.g., selection conditions 150 in FIG. 1) based on a first set of operational information associated with the network device (e.g., operational information 152 in FIG. 1) and a second set of operational information associated with the second network device (e.g., operational information 154 in FIG. 1) (operation 312). By checking a respective condition, the network device may determine whether to perform a suspension operation at the network device, which can indicate that the second network device is to forward traffic via the MC-LAG. Accordingly, the network device can select the second network device for forwarding traffic of the MC-LAG in response to the set of selection conditions indicating that the second network device is to be selected (operation 314). In the example in FIG. 1, if conditions 150 correspond to network device 102 for the suspension operation, network device 104 can be selected for forwarding traffic of MC-LAG 120.

Figure 4:
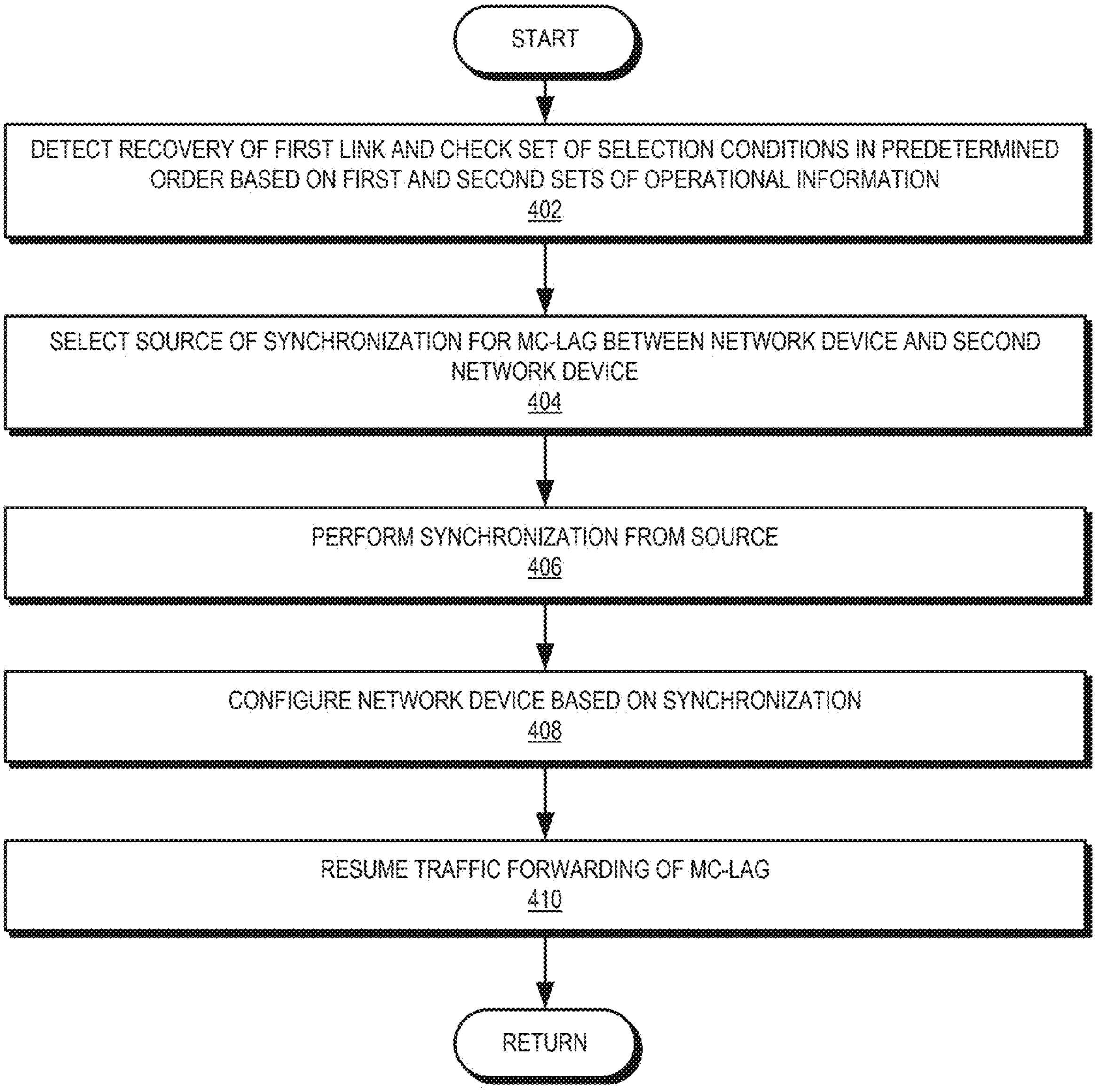
FIG. 4 presents a flowchart illustrating an example of a process of a network device in an MC-LAG synchronizing and transitioning for efficient split management, in accordance with an aspect of the present application.

FIG. 4 presents a flowchart illustrating an example of a process of a network device in an MC-LAG synchronizing and transitioning for efficient split management, in accordance with an aspect of the present application. During operation, the network device can detect the recovery of the first link and check the set of selection conditions in the predetermined order based on the first and second sets of operational information (i.e., the first and second sets of operational information of FIG. 3) (operation 402). In the example in FIG. 2, when network device 202 detects the recovery from the split in MC-LAG 220 (e.g., the recovery of link 212), network device 202 can check conditions 250 to determine which network device should be selected for the synchronization operation. The network device selected for the synchronization operation can retrieve the state information from the other network device, which can then be the source of the synchronization between the network devices.

Hence, the network device can select the source of the synchronization for the MC-LAG between the first network device and the second network device (operation 404). For example, if the network device is selected for the synchronization operation, the second network device can be selected as the source. The network device can then suspend its MC-LAG interface and retrieve the state information from the source. Accordingly, the network device can perform the synchronization from the source (operation 406). In the example in FIG. 2, when the synchronization operation is performed on network device 202 (operation 254), network device 202 can perform the synchronization from network device 204.

Upon completion of the synchronization, the network device can configure itself based on the state information synchronized from the second network device (operation 408). To do so, the network device can set the protocol states at the network device based on the synchronized information. Subsequently, the network device can resume traffic forwarding of the MC-LAG (operation 410). In the example in FIG. 1, upon setting the protocol states, network device 102 can resume forwarding traffic via interface 132 based on the protocol states. When both interfaces 132 and 134 start forwarding traffic, MC-LAG 120 can recommence its regular operations.

Figure 5:
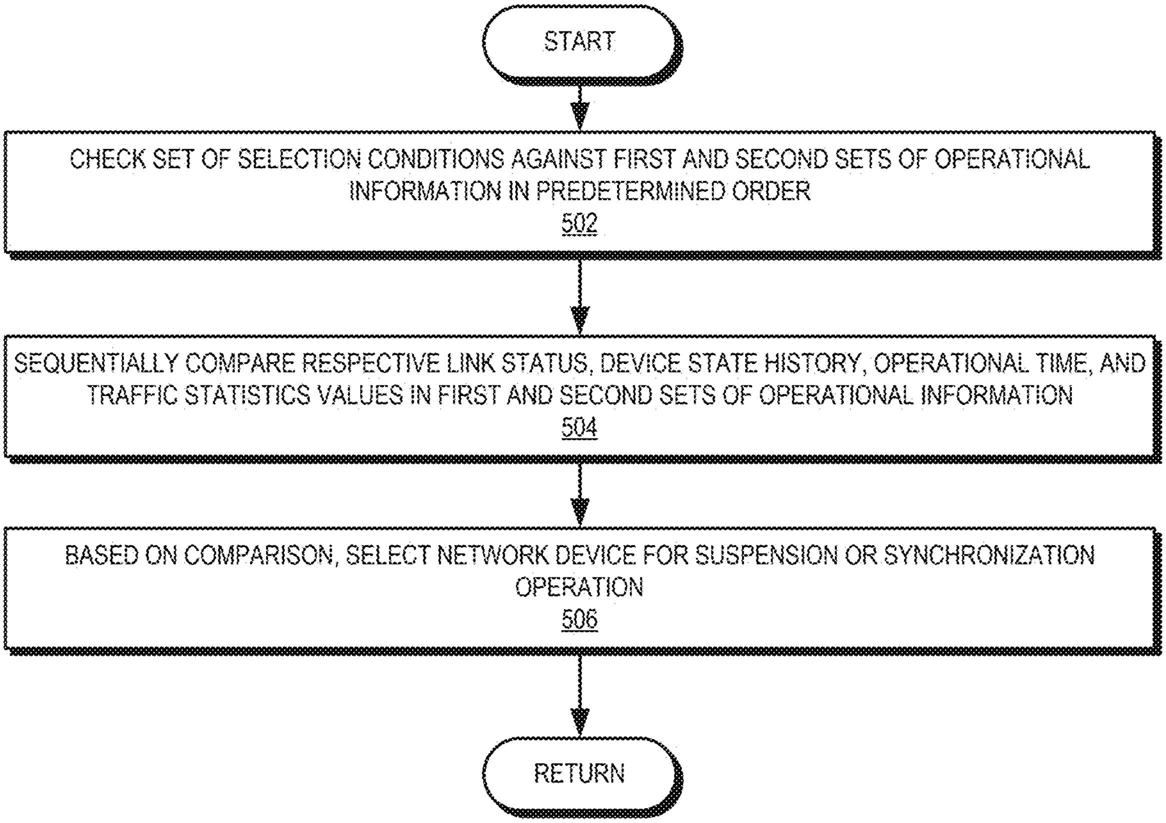
FIG. 5 presents a flowchart illustrating an example of a process of a network device in an MC-LAG selecting a network device for suspension and synchronization, in accordance with an aspect of the present application.

FIG. 5 presents a flowchart illustrating an example of a process of a network device in an MC-LAG selecting a network device for transition and synchronization, in accordance with an aspect of the present application. During operation, the network device can check the set of selection conditions against the first and second sets of operational information (i.e., the first and second sets of operational information of FIG. 3) in the predetermined order (operation 502). Here, a respective selection condition can compare corresponding pieces of information in the first and second sets of operational information to determine which network device is to be selected for the synchronization or suspension operation. In the example in FIG. 2, network devices 202 and 204 can compare the pieces of information in the order associated with conditions 250.

Accordingly, the network device can compare respective link status, device state history, operational time, and traffic statistics values in the first and second sets of operational information (operation 504). In the example in FIG. 2, network devices 202 and 204 can sequentially compare the respective link status, device state history, operational time, and traffic statistics values of the operational information for selection conditions 236. 238, 240, and 242, respectively. Based on the comparison, the network device can select the network device for the suspension or synchronization operation (operation 506). The network device can then execute the suspension or synchronization operation (operation 252 or 256 of FIG. 2).

Figure 6:
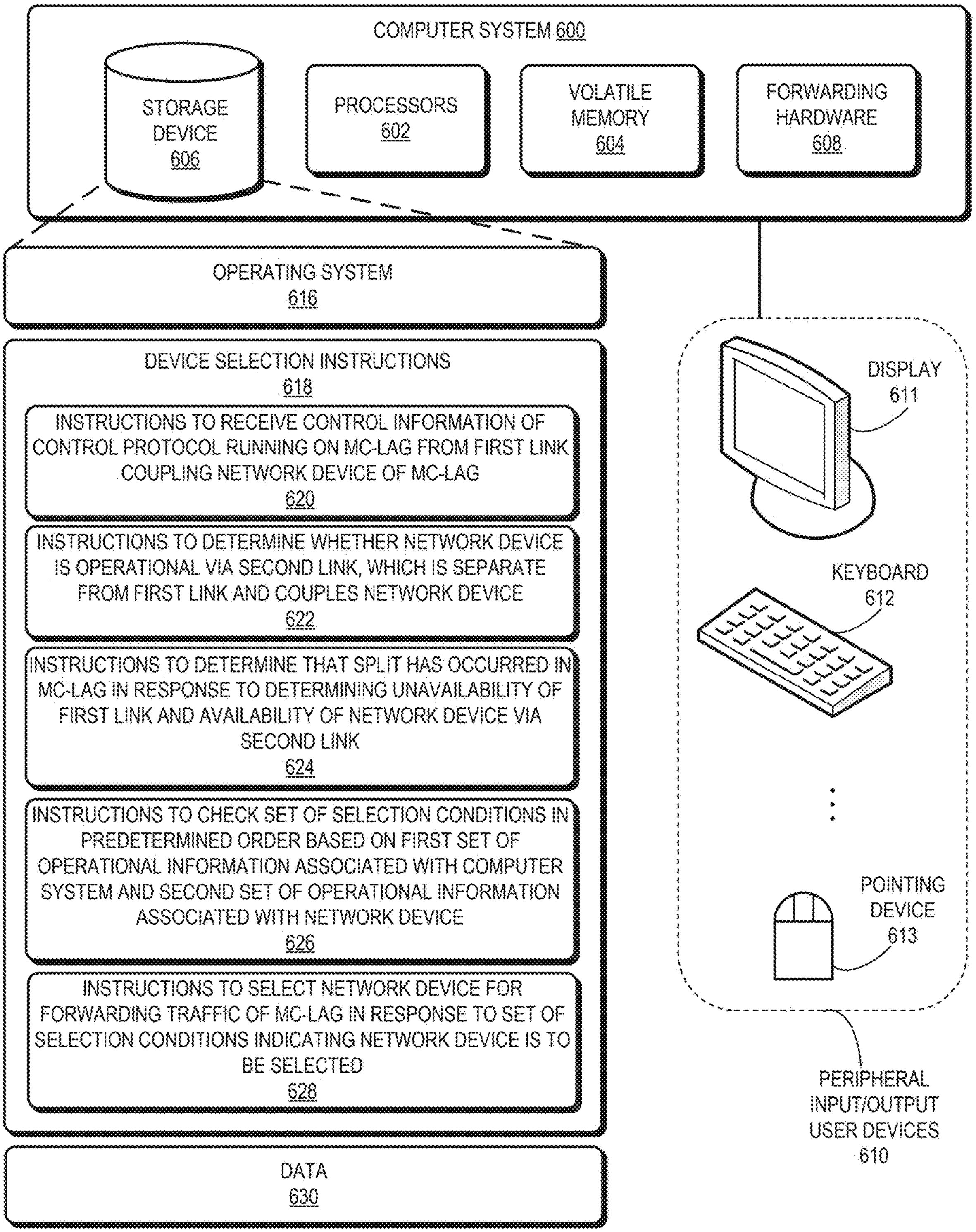
FIG. 6 illustrates an example of a computing system facilitating efficient split management in an MC-LAG, in accordance with an aspect of the present application.

FIG. 6 illustrates an example of a computing system facilitating efficient split management in an MC-LAG, in accordance with an aspect of the present application. Computer system 600 includes one or more processors 602, a memory 604, a storage device 606, and forwarding hardware 608. Processors 602 can include one or more processing resources, such as processor cores, GPUs, and TPUs. Memory 604 can include a volatile memory (e.g., random access memory (RAM)) that serves as a managed memory and can be used to store one or more memory pools. Furthermore, computer system 600 can be coupled to peripheral I/O user devices 610 (e.g., a display device 611, a keyboard 612, and a pointing device 613). Forwarding hardware 608 can include a Ternary Content Addressable Memory (TCAM). Storage device 606 includes a non-transitory computer-readable storage medium and stores an operating system 616, device selection instructions 618, and data 630. Computer system 600 may include fewer or more entities or instructions than those shown in FIG. 6.

Device selection instructions 618 can include instructions, which when executed by computer system 600, can cause computer system 600 to perform methods and/or processes described in this disclosure. Computer system 600 can be a network device, such as network device 102 in FIG. 1. Specifically, device selection instructions 618 may include instructions 620 to receive control information of a control protocol running on the MC-LAG from a first link coupling a network device of the MC-LAG. Here, the MC-LAG can be formed between the network device and computer system 600. In the example in FIG. 1, network device 102 can receive control information, such as state information, from network device 104 via link 112. Device selection instructions 618 may also include instructions 622 to determine whether the network device is operational via a second link, which is separate from the first link and couples the network device. In the example in FIG. 1, network device 102 can detect the availability of network device 104 via KAL 114.

Furthermore, device selection instructions 618 may also include instructions 624 to determine that a split has occurred in the MC-LAG in response to determining the unavailability of the first link and the availability of the network device via the second link. In the example in FIG. 1, network device 102 can determine a split in MC-LAG 120 upon determining the unavailability of link 112 and the availability of network device 104 via link 114. Moreover, device selection instructions 618 may include instructions 626 to check a set of selection conditions in a predetermined order based on the first set of operational information associated with computer system 600 and a second set of operational information associated with the network device. In the example in FIG. 1, network device 102 can check conditions 150 based on operational information 152 associated with network device 102 and operational information 154 associated with network device 104.

Furthermore, device selection instructions 618 may also include instructions 628 to select the network device for forwarding traffic of the MC-LAG in response to the set of selection conditions indicating the network device is to be selected (e.g., network device 102 of FIG. 1 selecting network device 104 for forwarding traffic of MC-LAG 120). Data 630 can include any data that is required as input, or that is generated as output by the methods, operations, communications, and/or processes described in this disclosure. Specifically, data 630 can include state information associated with a respective member device in an MC-LAG. Data 630 can also include operational information of a respective member device in an MC-LAG (e.g., operational information 152 and 154 in FIG. 1).

Computer system 600 and device selection instructions 618 may include more instructions than those shown in FIG. 6. For example, device selection instructions 618 can also store instructions for detecting an event 130 of FIG. 1; selecting a member device for performing the suspension or synchronization operation of FIG. 2; the operations depicted in the flowcharts of FIGS. 3, 4, and 5; and the instructions of non-transitory CRM 700 in FIG. 7.

Figure 7:
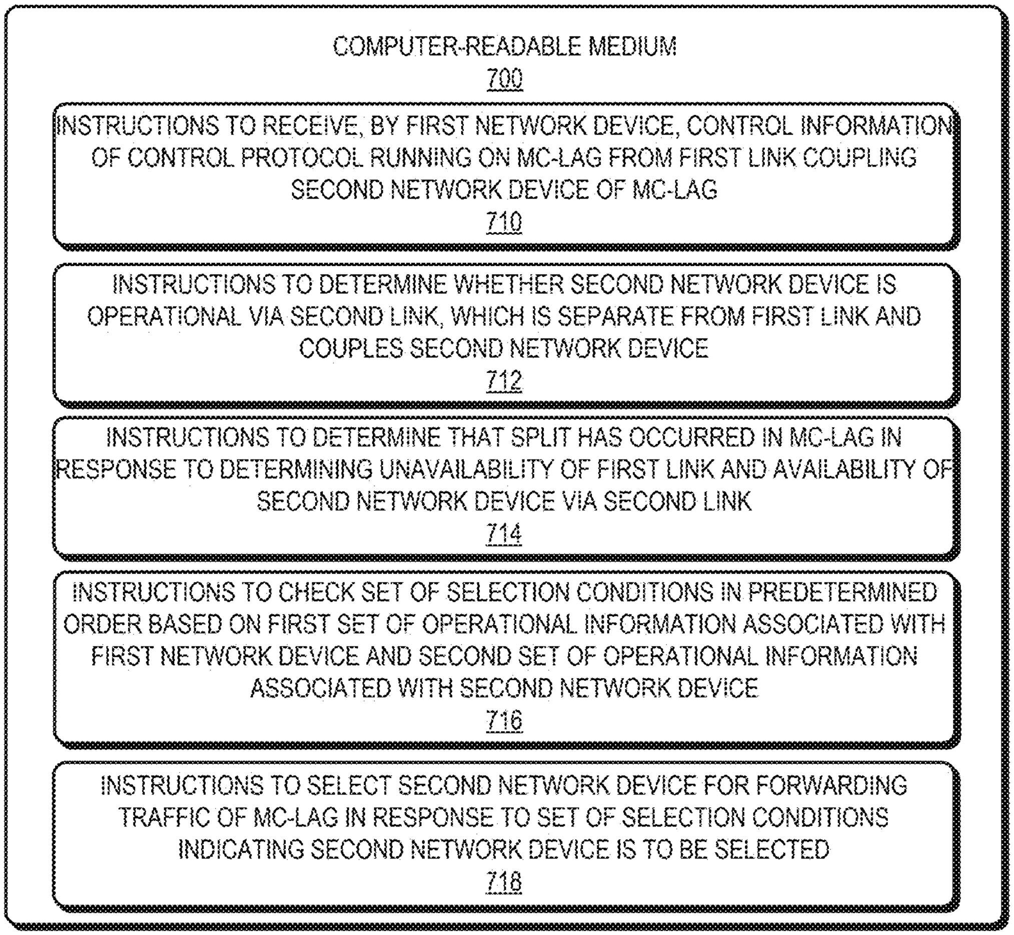
FIG. 7 illustrates an example of a computer-readable medium (CRM) facilitating efficient split management in an MC-LAG, in accordance with an aspect of the present application.

FIG. 7 illustrates an example of a CRM facilitating efficient split management in an MC-LAG, in accordance with an aspect of the present application. CRM 700 can include one or more non-transitory computer-readable mediums or devices storing instructions that when executed by a computer or processor cause the computer or processor to perform a method. Therefore, the instructions in CRM 700 can be stored in one or more non-transitory computer-readable mediums or devices. CRM 700 can store instructions 710 to receive, by a first network device, control information of a control protocol running on the MC-LAG from a first link coupling a second network device of the MC-LAG. In the example in FIG. 1, network device 102 can receive control information, such as state information, from network device 104 via link 112. CRM 700 can also include instructions 712 to determine whether the second network device is operational via a second link, which is separate from the first link and couples the second network device. In the example in FIG. 1, network device 102 can detect the availability of network device 104 via link 114.

CRM 700 can include instructions 714 to determine that a split has occurred in the MC-LAG in response to determining the unavailability of the first link and the availability of the second network device via the second link. In the example in FIG. 1, network device 102 can determine a split in MC-LAG 120 upon determining the unavailability of link 112 and the availability of network device 104 via link 114. CRM 700 can additionally include instructions 716 to check a set of selection conditions in a predetermined order based on the first set of operational information associated with the first network device and a second set of operational information associated with the second network device. In the example in FIG. 1, network device 102 can check conditions 150 based on operational information 152 associated with network device 102 and operational information 154 associated with network device 104.

Moreover, CRM 700 can include instructions 718 to select the second network device for forwarding traffic of the MC-LAG in response to the set of selection conditions indicating the second network device is to be selected (e.g., network device 102 of FIG. 1 selecting network device 104 for forwarding traffic of MC-LAG 120). CRM 700 may include more instructions than those shown in FIG. 7. For example, CRM 700 can also store instructions for detecting an event 130 of FIG. 1; selecting a member device for performing the suspension or synchronization operation of FIG. 2; the operations depicted in the flowcharts of FIGS. 3, 4, and 5; and the instructions of computer system 600 in FIG. 6.

The description herein is presented to enable any person skilled in the art to make and use the invention, and is provided in the context of a particular application and its requirements. Various modifications to the disclosed examples will be readily apparent to those skilled in the art, and the general principles defined herein may be applied to other examples and applications without departing from the spirit and scope of the present invention. Thus, the present invention is not limited to the examples shown, but is to be accorded the widest scope consistent with the claims.

One aspect of the present technology can provide a network device in a network. During operation, the network device can receive control information associated with a control protocol running on a multi-chassis link aggregation group (MC-LAG) from a first link coupling a second network device of the MC-LAG. The network device can determine whether the second network device is operational via a second link, which is separate from the first link, coupling the second network device. The network device can determine the unavailability of the first link and the availability of the second network device via the second link. Accordingly, the network device can determine that a split has occurred in the MC-LAG. Upon determining the split, the network device can check a set of selection conditions in a predetermined order based on a first set of operational information associated with the network device and a second set of operational information associated with the second network device. The network can then select the second network device for forwarding traffic of the MC-LAG in response to the set of selection conditions indicating the second network device is to be selected.

In a variation on this aspect, subsequent to determining the split has occurred, the network device can receive the second set of operational information associated with the second network device via the second link.

In a variation on this aspect, the second set of operational information can include one or more of: the link status of a respective link in the MC-LAG, the operational time of the link, device state history associated with the second network device, traffic volume associated with the MC-LAG at the second network device, and a number of address resolutions by the second network device; and In a further variation, the second network device can be selected based on at least one of: the link status of the second network device indicating unavailability, the device state history not indicating a steady state for the second network device, and the operational time of the second network device being lower than an operational time of the network device.

In a variation on this aspect, the network device can detect the recovery of the first link and check the set of selection conditions in the predetermined order based on the first and second sets of operational information.

In a further variation, the network device can select a source of synchronization for the MC-LAG between the network device and the second network device. Subsequently, the network device can perform the synchronization from the source.

In a further variation, the network device can configure the network device based on the synchronization. Subsequently, the network device can resume traffic forwarding of the MC-LAG from the network device.

In a variation on this aspect, the first network device can operate as a primary device for the MC-LAG and the second network device can operate as a secondary device for the MC-LAG.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

The methods and processes described herein can be executed by and/or included in hardware logic blocks or apparatus. These logic blocks or apparatus may include, but are not limited to, an application-specific integrated circuit (ASIC) chip, a field-programmable gate array (FPGA), a dedicated or shared processor that executes a particular software logic block or a piece of code at a particular time, and/or other programmable-logic devices now known or later developed. When the hardware logic blocks or apparatus are activated, they perform the methods and processes included within them.

The foregoing descriptions of examples of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method, comprising:

receiving, by a first network device, control information associated with a control protocol running on a multi-chassis link aggregation group (MC-LAG) from a first link coupling a second network device of the MC-LAG;

determining, by the first network device, whether the second network device is operational via a second link coupling the second network device, wherein the second link is separate from the first link;

determining that a split has occurred in the MC-LAG in response to determining unavailability of the first link and availability of the second network device via the second link;

subsequent to determining the split, checking a set of selection conditions in a predetermined order based on a first set of operational information associated with the first network device and a second set of operational information associated with the second network device; and selecting the second network device for forwarding traffic of the MC-LAG in response to the set of selection conditions indicating the second network device is to be selected.

2. The method of claim 1, further comprising, subsequent to determining the split has occurred, receiving the second set of operational information associated with the second network device via the second link.

3. The method of claim 1, wherein the second set of operational information comprises one or more of:

link status of the second link coupling the second network device;

operational time of the second link;

device state history associated with the second network device;

traffic volume associated with the MC-LAG at the second network device;

a number of address resolutions by the second network device; and a number of layer-2 addresses learned at the second network device.

4. The method of claim 3, wherein the second network device is selected based on at least one of:

the link status of the second link coupling the second network device indicating that the second link is up;

the device state history indicating a steady state for the second network device; and the operational time of the second link coupling the second network device being higher than an operational time of another link coupling the first network device, wherein the other link is separate from the first link and the second link.

5. The method of claim 1, further comprising:

detecting recovery of the first link; and checking the set of selection conditions in the predetermined order based on the first and second sets of operational information.

6. The method of claim 5, further comprising:

selecting a source of synchronization for the MC-LAG between the first network device and the second network device; and performing the synchronization from the source.

7. The method of claim 6, further comprising:

configuring the first network device based on the synchronization; and resuming traffic forwarding of the MC-LAG from the first network device.

8. The method of claim 1, wherein the first network device operates as a primary device for the MC-LAG and the second network device operates as a secondary device for the MC-LAG.

9. A non-transitory computer-readable storage medium storing instructions to:

receive, by a first network device, control information associated with a control protocol running on a multi-chassis link aggregation group (MC-LAG) from a first link coupling a second network device of the MC-LAG;

determine, by the first network device, whether the second network device is operational via a second link coupling the second network device, wherein the second link is separate from the first link;

determine that a split has occurred in the MC-LAG in response to determining unavailability of the first link and availability of the second network device via the second link;

subsequent to determining the split, check a set of selection conditions in a predetermined order based on a first set of operational information associated with the first network device and a second set of operational information associated with the second network device; and select the second network device for forwarding traffic of the MC-LAG in response to the set of selection conditions indicating the second network device is to be selected.

10. The non-transitory computer-readable storage medium of claim 9, wherein, subsequent to determining the split has occurred, the instructions are further to receive the second set of operational information associated with the second network device via the second link.

11. The non-transitory computer-readable storage medium of claim 9, wherein the second set of operational information comprises one or more of:

link status of the second link coupling the second network device;

operational time of the second link;

device state history associated with the second network device;

traffic volume associated with the MC-LAG at the second network device;

a number of address resolutions by the second network device; and a number of layer-2 addresses learned at the second network device.

12. The non-transitory computer-readable storage medium of claim 11, wherein the second network device is selected based on at least one of:

the link status of the second link coupling the second network device indicating that the second link is up;

the device state history indicating a steady state for the second network device; and the operational time of the second link coupling the second network device being higher than an operational time of another link coupling the first network device, wherein the other link is separate from the first link and the second link.

13. The non-transitory computer-readable storage medium of claim 9, wherein the instructions are further to:

detect recovery of the first link; and check the set of selection conditions in the predetermined order based on the first and second sets of operational information.

14. The non-transitory computer-readable storage medium of claim 13, wherein the instructions are further to:

select a source of synchronization for the MC-LAG between the first network device and the second network device; and perform the synchronization from the source.

15. The non-transitory computer-readable storage medium of claim 14, wherein the instructions are further to:

configure the first network device based on the synchronization; and resume traffic forwarding of the MC-LAG from the first network device.

16. The non-transitory computer-readable storage medium of claim 9, wherein the first network device operates as a primary device for the MC-LAG and the second network device operates as a secondary device for the MC-LAG.

17. A computer system, comprising:

one or more processing resources; and a non-transitory computer-readable storage medium storing instructions that when executed by the one or more processing resources cause the computer system to:

receive control information associated with a control protocol running on a multi-chassis link aggregation group (MC-LAG) from a first link coupling a second computer system of the MC-LAG;

determine whether the second computer system is operational via a second link coupling the second computer system, wherein the second link is separate from the first link;

determine determining that a split has occurred in the MC-LAG in response to determining unavailability of the first link and availability of the second computer system via the second link;

subsequent to determining the split, check a set of selection conditions in a predetermined order based on a first set of operational information associated with the computer system and a second set of operational information associated with the second computer system; and select the second computer system for forwarding traffic of the MC-LAG in response to the set of selection conditions indicating the second computer system is to be selected.

18. The computer system of claim 17, wherein the second computer system is selected based on at least one of:

a link status of the second link coupling the second computer system indicating that the second link is up;

a device state history indicating a steady state for the second computer system; and an operational time of the second link coupling the second computer system being higher than an operational time of another link coupling the computer system, wherein the other link is separate from the first link and the second link.

19. The computer system of claim 17, wherein the instructions, when executed by the one or more processing resources, further cause the computer system to:

detect recovery of the first link; and check the set of selection conditions in the predetermined order based on the first and second sets of operational information.

20. The computer system of claim 19, wherein the instructions, when executed by the one or more processing resources, further cause the computer system to:

select a source of synchronization for the MC-LAG between the computer system and the second computer system;

perform the synchronization from the source; and configure the computer system based on the synchronization.

* * * * *